(12) United States Patent
Hanioka

(10) Patent No.: US 9,637,633 B2
(45) Date of Patent: May 2, 2017

(54) RESIN COMPOSITION AND RESIN MOLDED ARTICLE

(71) Applicant: FUJI XEROX CO., LTD., Tokyo (JP)

(72) Inventor: Yuto Hanioka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 69 days.

(21) Appl. No.: 14/626,104

(22) Filed: Feb. 19, 2015

(65) Prior Publication Data

US 2016/0083577 A1 Mar. 24, 2016

(30) Foreign Application Priority Data

Sep. 24, 2014 (JP) .................. 2014-194450

(51) Int. Cl.
  *C08L 69/00* (2006.01)
  *C08L 55/02* (2006.01)
  *C08L 67/04* (2006.01)

(52) U.S. Cl.
  CPC ............... *C08L 69/00* (2013.01); *C08L 67/04* (2013.01); *C08L 2205/03* (2013.01)

(58) Field of Classification Search
  None
  See application file for complete search history.

(56) References Cited

U.S. PATENT DOCUMENTS

| | | | |
|---|---|---|---|
| 2004/0147674 A1* | 7/2004 | Kakeda | C08F 293/005 525/88 |
| 2007/0285777 A1* | 12/2007 | Toyoshima | G02B 1/105 359/487.05 |
| 2008/0051508 A1 | 2/2008 | Hayata et al. | |
| 2009/0051508 A1* | 2/2009 | Yamano | G08B 3/10 340/384.1 |
| 2009/0311511 A1* | 12/2009 | Obuchi | B32B 27/36 428/323 |
| 2011/0301266 A1* | 12/2011 | Yamanaka | C07F 9/657181 524/120 |
| 2015/0361261 A1* | 12/2015 | Imada | C08L 69/00 525/92 D |

FOREIGN PATENT DOCUMENTS

JP 2006-199743 A 8/2006

* cited by examiner

*Primary Examiner* — Jeffrey Mullis
(74) *Attorney, Agent, or Firm* — Oliff PLC

(57) ABSTRACT

A resin composition includes a polyester resin, an alloyed resin of a polycarbonate resin and an acrylonitrile-butadiene rubber-styrene resin, and an acrylic block copolymer containing a polymer block containing an acrylic acid ester monomer unit and a polymer block containing a methacrylic acid ester monomer unit, wherein a weight ratio of a content of the polyester resin and a content of the alloyed resin is in a range of 5:95 to 50:50, and wherein a content of the acrylic block copolymer is in a range of 0.5% by weight to 10% by weight with respect to a total of the content of the polyester resin and the content of the alloyed resin.

8 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-194450 filed Sep. 24, 2014.

BACKGROUND

1. Technical Field

The invention relates to a resin composition and a resin molded article.

2. Related Art

As components of electrical goods or electrical and electronic apparatuses, polymer materials such as polystyrene, a polystyrene-ABS resin copolymer, polycarbonate, polyester, polyphenylene sulfide, and polyacetal are used since they have excellent heat resistance and excellent mechanical strength, and particularly, in the case of the components of the electrical and electronic apparatuses, the polymer materials are used since they maintain excellent mechanical strength against environmental change.

Resin compositions containing these polymer materials and molded articles obtained by using the resin compositions are reviewed in various ways. In addition, in view of environmental problems, a resin composition containing a polylactic acid resin which is a kind of the biodegradable polymer and a molded article obtained by using the resin composition are known.

SUMMARY

According to an aspect of the invention, there is provided a resin composition including:

a polyester resin;

an alloyed resin of a polycarbonate resin and an acrylonitrile-butadiene rubber-styrene resin; and an acrylic block copolymer containing a polymer block containing an acrylic acid ester monomer unit and a polymer block containing a methacrylic acid ester monomer unit, wherein a weight ratio of a content of the polyester resin and a content of the alloyed resin is in a range of 5:95 to 50:50, and wherein a content of the acrylic block copolymer is in a range of 0.5% by weight to 10% by weight with respect to a total of the content of the polyester resin and the content of the alloyed resin.

DETAILED DESCRIPTION

Exemplary embodiments of the invention are described below. The exemplary embodiments are described as an example for carrying out the invention, and the invention is not limited thereto.

A resin composition according to the exemplary embodiment of the invention contains a polyester resin, an alloyed resin of a polycarbonate resin and an acrylonitrile-butadiene rubber-styrene resin (hereinafter, simply referred to as a "polycarbonate/ABS resin"), and an acrylic block copolymer of a polymer block containing an acrylic acid ester monomer unit and a polymer block containing a methacrylic acid ester monomer unit. The weight ratio of the content of the polyester resin and the content of the polycarbonate/ABS resin is in a range of 5:95 to 50:50, and the content of the acrylic block copolymer is in a range of 0.5% by weight to 10% by weight with respect to the total amount of the content of the polyester resin and the content of the polycarbonate/ABS resin. The resin composition according to the exemplary embodiment contains the acrylic block copolymer in the range described above, and contains the polyester resin and the polycarbonate/ABS resin in the range described above, so an article molded from the resin composition has excellent impact resistance and excellent elongation characteristics. In addition, the article molded from the resin composition according to the exemplary embodiment has excellent heat resistance.

A technique in which a specific amount of a vinyl graft copolymer is added to a resin composition composed of a polycarbonate resin and a polylactic acid resin to have excellent mechanical characteristics of polycarbonate and excellent fluidity of polylactic acid is suggested. However, impact resistance and elongation characteristics are insufficient. The inventors of the invention have found that impact resistance and elongation characteristics are excellent with respect to a molded article prepared by a resin composition containing a polyester resin and a polycarbonate/ABS resin, which an acrylic block copolymer is contained in a specific range and which the polyester resin and the polycarbonate/ABS resin are contained in a specific range.

Polyester Resin

Examples of the polyester resin include an aliphatic polyester resin and an aromatic polyester resin. The polyester resins are broadly classified into a microorganism produced polymer, a synthetic polymer, and a semisynthetic polymer. Examples of the microorganism produced polymer include polyhydroxybutyrate and polyhydroxyvalerate. Examples of the synthetic polymer include polycaprolactone and a condensate of aliphatic dicarboxylic acid and aliphatic diol. Examples of the semisynthetic polymer include a polylactic acid polymer (polylactic acid resin). The polyester resins may be used singly, or two or more types thereof may be used in combination.

Among the polyester resins, in view of workability and biodegradability, a semisynthetic polymer is preferable, and a polylactic acid polymer (polylactic acid resin) is more preferable. Particularly, since lactic acid may be synthesized from a non-petroleum raw material such as sweet potato or corn, the polylactic acid resin may deal with the movement of switching from a resin obtained by using a petroleum resource, to a resin obtained by not using a petroleum resource. In this manner, the polylactic acid resin is derived from plants, and has an effect of reducing environmental burdens, and specifically, an effect of reducing $CO_2$ emission amounts and reducing petroleum consumption amounts.

The polylactic acid resin is not particularly limited, as long as it is a condensate of lactic acid, and examples of the polylactic acid resin include polylactic acid or a copolymer of a lactic acid and other monomers. The polylactic acid resins may be used singly, or two or more types thereof may be used in combination. The content of the other monomers may be generally 1% by mol to 50% by mol in the total monomer components. In addition, as the polylactic acid resin, a modified resin may be used and, for example a maleic anhydride-modified polylactic acid, an epoxy-modified polylactic acid, or an amine-modified polylactic acid may be used.

The other monomers may be a compound having two or more ester bond forming functional groups, and examples of the monomers include dicarboxylic acid, polyol, hydroxy carboxylic acid, and lactone.

Examples of the dicarboxylic acid include succinic acid, azelaic acid, sebacic acid, terephthalic acid, and isophthalic acid.

Examples of the polyol include aromatic polyol such as a compound obtained by additional reaction of ethylene oxide to bisphenol; aliphatic polyol such as ethylene glycol, propylene glycol, butanediol, hexanediol, octanediol, glycerin, sorbitan, trimethylol propane, and neopentyl glycol; and ether glycol such as diethylene glycol, triethylene glycol, polyethylene glycol, and polypropylene glycol.

Examples of the hydroxy carboxylic acid include glycol acid, hydroxybutyl carboxylic acid, and hydroxy carboxylic acid disclosed in JP-A-6-184417.

Examples of the lactone include glycolide, ε-caprolactone glycolide, ε-caprolactone, β-propiolactone, δ-butyrolactone, β- or γ-butyrolactone, pivalolactone, and δ-valerolactone.

As a synthetic method of a polylactic acid resin, well-known synthetic methods may be used. Examples of the synthetic method of the polylactic acid resin include a synthetic method disclosed in JP-A-7-33861; a synthetic method disclosed in JP-A-59-96123; and a synthetic method disclosed in "Polymer preprints, Japan" Book 44, pp. 3198 to 3199. Specific examples of the synthetic method include a synthetic method by a direct dehydrative condensation of a lactic acid and a synthetic method by ring-opened polymerization of lactide.

Examples of the lactide include L-lactide, D-lactide, DL-lactide, and meso-lactide. The lactide may be used singly, or two or more types thereof may be used in combination.

Examples of the lactic acid include L-lactic acid, D-lactic acid, and DL-lactic acid. The lactic acid may be used singly, or two or more types thereof may be used in combination.

The polylactic acid resin may be poly-L-lactic acid (hereinafter, also referred to as "PLLA"), may be poly-D-lactic acid (hereinafter, also referred to as "PDLA"), may be a product obtained by mixing these by copolymerizing or blending, or may be a stereo complex-type polylactic acid (hereinafter, also referred to as "SC-PLA") having high resistance obtained by mixing poly-L-lactic acid and poly-D-lactic acid to form spiral structures thereof being meshed.

A component ratio (percentage of molar ratio) of poly-L-lactic acid and poly-D-lactic acid in a copolymer or a mixture is not particularly limited. In view of heat resistance or the like, a L-lactic acid/D-lactic acid ratio is preferably in a range of 50/50 to 99.99/0.01. If the L-lactic acid/D-lactic acid ratio is less than 50/50, the mechanical characteristics of a molded article formed from the resin composition may decrease, and if the L-lactic acid/D-lactic acid ratio is greater than 99.99/0.01, costs may increase.

As a polylactic acid resin, a synthesized product or a commercially available product may be used. Examples of the commercially available product include "Terramac TE4000", "Terramac TE2000", and "Terramac TE7000" manufactured by Unitika Ltd., "Ingeo3251D", "Ingeo3001D", and "Ingeo4032D" manufactured by NatureWorks LLC, and "REVODE110" and "REVODE190" manufactured by Zhejiang Hisun Biomaterials Co., Ltd.

The molecular weight of the polylactic acid resin is not particularly limited, but the weight-average molecular weight of the polylactic acid resin according to the exemplary embodiment is preferably in a range of 50,000 to 300,000, and more preferably in a range of 70,000 to 250,000. If the weight-average molecular weight of the polylactic acid resin is less than 50,000, the mechanical characteristics of a molded article formed from the resin composition may decrease, and if the weight-average molecular weight of the polylactic acid resin is greater than 300,000, workability may be unsatisfactory.

The glass transition temperature of the polylactic acid resin is not particularly limited, but the glass transition temperature is preferably in a range of 100° C. to 250° C., and more preferably in a range of 120° C. to 200° C. If the glass transition temperature of the polylactic acid resin is less than 100° C., the mechanical characteristics of a molded article formed from the resin composition may decrease, and if the glass transition temperature of the polylactic acid resin is greater than 250° C., workability may be unsatisfactory.

In the manufacture of a polylactic acid resin, for example, cyclic lactone such as butyrolactone, and 1,6-dioxacyclodecane-2,7-dione may be contained in the polylactic acid resin as impurities. The smaller content of an impurity such as the lactone compound is preferable. Specifically, the content is preferably less than 10% by weight with respect to the amount of the polylactic acid, and more preferably less than 5% by weight. If the content of the impurity such as the lactone compound is 10% by weight or greater, the impurity reacts with a polycarbonate-epoxy compound or the like, reactivity with polyamide decreases, and, as a result, mechanical characteristics of a molded article formed from the resin composition may decrease.

Polycarbonate/ABS Resin

The resin composition according to the exemplary embodiment contains an alloyed resin of a polycarbonate resin and an acrylonitrile-butadiene rubber-styrene resin, as the resin component, in addition to the polylactic acid resin. Impact resistance or the like is enhanced by containing the polycarbonate/ABS resin.

The polycarbonate resin is not particularly limited, as long as the polycarbonate resin is a polymer which is obtained by polycondensation of one or more monomers and has at least one carbonate group. Examples of the polycarbonate resin include an aromatic polycarbonate resin such as bisphenol A-type polycarbonate, bisphenol S-type polycarbonate, and biphenyl-type polycarbonate.

The acrylonitrile-butadiene rubber-styrene resin (ABS resin) is a copolymer of acrylonitrile, butadiene rubber, and styrene.

As the polycarbonate/ABS resin, a synthesized product or a commercially available product may be used. Examples of the commercially available product include "Panlite TN7300" (polycarbonate/ABS alloy resin) manufactured by Tejin Limited. In addition, the polycarbonate/ABS resin may be used singly, or two or more types thereof may be used in combination.

The molecular weight of the polycarbonate/ABS resin is not particularly limited, but the weight-average molecular weight of the polycarbonate/ABS resin according to the exemplary embodiment is preferably in a range of 5,000 to 300,000, and more preferably in a range of 10,000 to 150,000. If the weight-average molecular weight of the polycarbonate/ABS resin is less than 5,000, workability may decrease due to excessive fluidity, and if the weight-average molecular weight of the polycarbonate/ABS resin is greater than 300,000, workability may decrease due to insufficient fluidity.

The glass transition temperature of the polycarbonate/ABS resin is not particularly limited, but the glass transition temperature is preferably in a range of 80° C. to 200° C., and more preferably in a range of 90° C. to 180° C. If the glass transition temperature of the polycarbonate/ABS resin is less than 80° C., heat resistance of a molded article formed from the resin composition may be insufficient, and if the glass transition temperature of the polycarbonate/ABS resin is greater than 200° C., workability may be insufficient.

The weight ratio of the content of the polyester resin and the content of the polycarbonate/ABS resin is preferably in a range of 5:95 to 50:50, and more preferably in a range of 20:80 to 40:60. If the weight ratio of the content of the polyester resin and the content of the polycarbonate/ABS resin is less than 5:95, contribution to the reduction of the environmental burden may decrease, and if the weight ratio is greater than 50:50, sufficient impact resistance of a molded article formed from the resin composition may not be obtained.

The polycarbonate/ABS resin may be a recovered resin which is recovered from the market. Accordingly, the recovered resin which is recovered from the market is effectively used to decrease costs and to be excellently environmental. By using a recycled material using the polyester resin and the polycarbonate/ABS resin recovered from the market in a resin composition according to the exemplary embodiment, it is possible to obtain the resin composition which decreases costs and is excellently environmental and which has excellent impact resistance and excellent elongation characteristics of a molded article formed from the resin composition.

Acrylic Block Copolymer

The resin composition according to the exemplary embodiment contains an acrylic block copolymer constituted with a polymer block containing an acrylic acid ester monomer unit and a polymer block containing a methacrylic acid ester monomer unit.

Examples of the acrylic acid ester monomer include an acrylic acid ester such as methyl acrylate, ethyl acrylate, propyl acrylate, butyl acrylate, isobutyl acrylate, n-octyl acrylate, dodecyl acrylate, 2-ethylhexyl acrylate, stearyl acrylate, phenyl acrylate, dimethylaminoethyl acrylate, and the like, and alkyl acrylate is preferable.

Examples of the methacrylic acid ester monomer include a methacrylic acid ester such as methyl methacrylate, ethyl methacrylate, propyl methacrylate, butyl methacrylate, hexyl methacrylate, cyclohexyl methacrylate, octyl methacrylate, nonyl methacrylate, octadecyl methacrylate, dodecyl methacrylate, and 2-ethylhexyl methacrylate, and alkyl methacrylate is preferable.

The weight-average molecular weight of the acrylic block copolymer is preferably in a range of 20,000 to 140,000, and more preferably in a range of 60,000 to 80,000.

The molecular weight distribution of the acrylic block copolymer (Mw/Mn) is preferably in a range of 1.0 to 2.0, and more preferably in a range of 1.0 to 1.7. If the molecular weight distribution of the acrylic block copolymer (Mw/Mn) is greater than 2.0, the effect with respect to impact resistance and elongation may not be provided.

The acrylic block copolymer may include a polymer block containing a monomer unit other than the acrylic acid ester monomer unit and the methacrylic acid ester monomer unit. Examples of the other monomer include glycidyl acrylate, allyl acrylate, methacrylic acid, acrylic acid, aromatic vinyl compound, acrylonitrile, methacrylonitrile, and olefin.

Relating to ratios of respective polymer blocks in the acrylic block copolymer, with respect to the total weight of the acrylic block copolymer, it is preferable that the content of the polymer block containing the acrylic acid ester monomer unit is in a range of 50% by weight to 95% by weight, and the content of the polymer block containing the methacrylic acid ester monomer unit is in a range of 5% by weight to 50% by weight, and it is more preferable that the content of the polymer block containing the acrylic acid ester monomer unit is in a range of 50% by weight to 85% by weight, and the content of the polymer block containing the methacrylic acid ester monomer unit is in a range of 15% by weight to 50% by weight.

If the polymer block containing the acrylic acid ester monomer unit is A, and the polymer block containing the methacrylic acid ester monomer unit is B, the acrylic block copolymer may be an AB-type diblock copolymer, may be an ABA-type triblock copolymer, or may be a BAB-type triblock copolymer. In view of enhancement of the impact resistance, triblock copolymers are preferable.

For example, the acrylic block copolymer is obtained by a method of living-polymerizing monomers constituting respective blocks.

The content of the acrylic block copolymer is in a range of 0.5% by weight to 10% by weight and preferably in a range of 1% by weight to 8% by weight with respect to the total amount of the content of the polyester resin and the content of the polycarbonate/ABS resin. If the content of the acrylic block copolymer is less than 0.5% by weight with respect to the total amount of the content of the polyester resin and the content of the polycarbonate/ABS resin, the effect to the impact resistance is not sufficient, and if the content is greater than 10% by weight, the effect to the elongation is not sufficient.

Other Additives

In the resin composition according to the exemplary embodiment, if necessary, other additives such as a flame retardant, an antioxidant, a filler, and a drip preventing agent may be used. The content of each of the other components is preferably 10% by weight or less based on the total amount of the solid content of the resin composition.

The flame retardance of a molded article formed from the resin composition is enhanced by containing a flame retardant. As the flame retardant, a product generally used as the flame retardant of the resin may be used, and the flame retardant is not particularly limited. Examples thereof include an inorganic flame retardant and an organic flame retardant. Specific examples of the inorganic flame retardant include silica flame retardant such as magnesium hydroxide, aluminum hydroxide, silicon dioxide, and a low meting point glass, and specific examples of the organic flame retardant include a phosphate compound and a phosphoric acid ester compound. Examples of the flame retardant used in the exemplary embodiment are described above, but in view of the flame retardance efficiency, phosphate compound is preferable, and polyphosphoric acid ammonium is particularly preferable. The flame retardant may be used singly, but two or more types thereof may be used in combination.

Examples of the antioxidant include a phenol antioxidant, an amine antioxidant, a phosphorus antioxidant, a sulfur antioxidant, a hydroquinone antioxidant, and a quinoline antioxidant. The antioxidant may be used singly, or two or more types thereof may be used in combination.

Examples of the filler include clay such as kaoline, bentonite, kibushi clay, and gaerome clay, talc, mica, and montmorillonite. The filler may be used singly, or two or more types thereof may be used in combination.

Anti-drip (melting and dripping) properties of a molded article formed from the resin composition are enhanced by containing the drip preventing agent. As the drip preventing agent, a synthesized product or a commercially available product may be used. Examples of the commercially available product include "PTFE CD145" manufactured by Asahi Glass Co., Ltd. which is polytetrafluoroethylene, and "FA500H" manufactured by Daikin Industries Ltd. The drip preventing agent may be used singly, or two or more types thereof may be used in combination.

Various Measurement Methods

Contents of the polyester resin, the polycarbonate/ABS resin, and the acrylic block copolymer in the resin composition are measured by the $^1$H-NMR analysis. Contents of impurities such as lactone compounds included in the polylactic acid in the resin composition are also measured by the same method. Contents of the polyester resin, the polycarbonate/ABS resin, and the acrylic block copolymer in the resin molded article obtained by using the resin composition are measured by the $^1$H-NMR analysis. The contents of the polyester resin, the polycarbonate/ABS resin, and the acrylic block copolymer in the resin composition are evaluated from the contents of the polyester resin, the polycarbonate/ABS resin, and the acrylic block copolymer in the resin molded article which are measured in this manner.

The weight-average molecular weights of the polyester resin, the polycarbonate/ABS resin, and the acrylic block copolymer in the resin composition are obtained by dissolving the polymers in a solvent, and performing size-exclusion chromatography (GPC) with the solution. The polymers are dissolved in tetrahydrofuran (THF) to be analyzed by the molecular weight distribution measurement (GPC). The weight-average molecular weights of the polyester resin, the polycarbonate/ABS resin, and the acrylic block copolymer in the resin molded article obtained by using the resin composition are obtained by dissolving the polymers in a solvent, and performing size-exclusion chromatography (GPC) with the solution. The polymers are dissolved in tetrahydrofuran (THF) to be analyzed by the molecular weight distribution measurement (GPC).

The glass transition temperatures of the polyester resin and the polycarbonate/ABS resin in the resin composition are measured by a method of JIS K 7121 using a thermal analyzer (DSC6000 manufactured by SII NanoTechnology). The glass transition temperatures of the polyester resin and the polycarbonate/ABS resin in the resin molded article obtained by using the resin composition are measured by a method of JIS K 7121 using a thermal analyzer (DSC6000 manufactured by SII NanoTechnology).

Whether the resin composition and the resin molded article that is obtained by using the resin composition contain acrylic block copolymers, and the ratio of polymer blocks in the acrylic block copolymer are measured by using JNM-LA400 (manufactured by JEOL Ltd., nuclear magnetic resonance device), in the method of $^1$H-NMR (1H-nuclear magnetic resonance).

With respect to the resin composition and the resin molded article obtained by using the resin composition, contents of other additives, and the like in the resin composition and the resin molded article are measured by measuring structures or composition ratios of respective materials with an element analyzer, an NMR apparatus, an IR apparatus, and the like. In addition, contents of the other additives and the like in the resin composition are evaluated from the contents of the other additives and the like in the resin molded article.

Method of Manufacturing Resin Composition

The resin composition according to the exemplary embodiment may be manufactured by kneading, for example, a polyester resin, a polycarbonate/ABS resin, an acrylic block copolymer, and, if necessary, other components.

For example, kneading may be performed by using a well-known kneading apparatus such as a twin screw kneader (TEM58SS manufactured by Toshiba Machine Co., Ltd.) and a simple kneader (Labo Plastomill manufactured by Toyo Seiki Seisaku-Sho, Ltd.). Here, for example, the temperature condition of the kneading (cylinder temperature condition) is preferably in a range of 170° C. to 220° C., and more preferably in a range of 180° C. to 220° C., and most preferably in a range of 190° C. to 220° C. Accordingly, it is possible to easily obtain a molded article having excellent impact resistance and excellent elongation characteristics.

Resin Molded Article

The resin molded article according to the exemplary embodiment is obtained by molding the resin composition according to the exemplary embodiment as described above.

For example, the resin molded article according to the exemplary embodiment is obtained by molding the resin composition by using molding methods such as injection molding, extrusion molding, blow molding, and hot press molding. For the reason of productivity, it is preferable that the resin molded article is obtained by injection-molding the resin composition according to the exemplary embodiment.

For example, the injection molding may be performed by using commercially available apparatuses such as "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd. At this point, in view of suppression of the resin from degradation, the cylinder temperature is preferably in a range of 170° C. to 250° C., and more preferably in a range of 180° C. to 240° C. In addition, in view of productivity, the mold temperature is preferably in a range of 30° C. to 100° C., and more preferably in a range of 30° C. to 60° C.

The resin molded article according to the exemplary embodiment has excellent impact resistance and excellent elongation characteristics. In addition, the resin molded article according to the exemplary embodiment has excellent heat resistance and the like.

Components of Electrical and Electronic Apparatus

Since the resin molded article according to the exemplary embodiment may have excellent mechanical strength (impact resistance, elastic modulus in tension, and the like), the resin molded article is appropriately used for electrical and electronic apparatuses, home appliances, containers, and interior materials for automobiles. More specifically, examples of the usage include housings, various components, or the like for home appliances or electrical and electronic apparatuses, wrapping films, storage cases of CD-ROM, DVD, or the like, tableware, food trays, drink bottles, and medicine wrapping materials. Among these, the resin molded article according to the exemplary embodiment is preferably used for components for electrical and electronic apparatuses. Specifically, since the components for electrical and electronic apparatuses have complicated shapes in many cases, and are heavy products, the components for electrical and electronic apparatuses require high impact resistance compared with the case in which the components are not heavy products. However, the resin molded article according to the exemplary embodiment sufficiently satisfies such requirements. The resin molded article according to the exemplary embodiment is particularly preferably used for housings for image forming apparatuses or copying machines.

Examples

Hereinafter, the invention is more specifically described with reference to examples and comparative examples. However, the invention is not limited the examples.

Examples and Comparative Examples

Raw materials in compositions (parts by weight) described in Tables 1 and 2 are blended, the raw materials are put into a twin screw kneader (TEM58SS manufactured by Toshiba Machine Co., Ltd.), and the raw materials are kneaded at a cylinder temperature of 200° C. to obtain resin compositions (compound). Subsequently, test samples are obtained by molding the obtained resin compositions in an injection molding apparatus (NEX150E manufactured by Nissei Plastic Industrial Co., Ltd.) at a cylinder temperature of 190° C. and a mold temperature of 100° C. With respect to the respective components presented in Tables 1 and 2, product names and manufacturers' names are presented in Table 3.

Evaluation Method
Impact Strength (Impact Resistance Evaluation)

Charpy impact resistance strength ($kJ/m^2$) is measured with products obtained by performing notch processing on ISO multipurpose dumbbell test samples according to a method regulated by ISO-179 by an impact resistance testing apparatus (DG-5 manufactured by Toyo Seiki Seisaku-Sho, Ltd.). Evaluation is performed based on criteria described below. Results are presented in Tables 1 and 2.
A: 15.0 or greater
B: 8.0 or greater and less than 15.0
C: Less than 8.0

Tension Test (Elongation Characteristic Evaluation)

Tensile elongation at break of ISO multipurpose dumbbell test samples (test samples of JIS #1 having thickness of 4 mm) is measured in conformity with JIS K-7113. The tensile elongation at break is evaluated based on the criteria described below. The results thereof are presented in Tables 1 and 2.
A: 30% or greater
B: 20% or greater and less than 30%
C: Less than 20%

Heat Resistance Test (Heat Resistance Evaluation)

Heat deformation temperatures under load of 1.80 MPa are measured in conformity with a method regulated in ISO-75 by using test samples obtained by cutting clamp portions of the ISO multipurpose dumbbell test samples. The heat deformation temperatures are evaluated based on the criteria described below. The results thereof are presented in Tables 1 and 2.
A: 70° C. or greater
B: 60° C. or greater and less than 70° C.
C: Less than 60° C.

TABLE 1

|  |  | Example 1 | Example 2 | Example 3 | Example 4 | Example 5 | Example 6 |
|---|---|---|---|---|---|---|---|
| Polyester resin | A1 | 30 | 5 | 50 | 30 | 30 | 30 |
| Polycarbonate/ABS resin | B1 | 70 | 95 | 50 | 70 | 70 | 70 |
|  | B2 |  |  |  |  |  |  |
| Acrylic block copolymer | C1 | 1.5 | 1.5 | 1.5 | 0.5 | 10 |  |
|  | C2 |  |  |  |  |  | 1.5 |
| Charpy impact strength [$kJ/m^2$] |  | A (24.3) | A (20.4) | A (15.6) | A (16.1) | A (17.4) | A (25.6) |
| Tensile elongation at break [%] |  | A (36.5) | A (37.4) | A (32.6) | A (34.8) | A (38.2) | A (34.2) |
| Heat resistance [° C.] |  | A (76) | A (78) | A (71) | A (75) | A (75) | A (77) |

TABLE 2

|  |  | Comparative Example 1 | Comparative Example 2 | Comparative Example 3 | Comparative Example 4 | Reference Example 1 | Reference Example 2 |
|---|---|---|---|---|---|---|---|
| Polyester resin | A1 | 30 | 55 | 30 | 30 | 100 | 100 |
| Polycarbonate/ABS resin | B1 | 70 | 45 | 70 | 70 |  |  |
|  | B2 |  |  |  |  |  |  |
| Acrylic block copolymer | C1 |  | 1.5 | 0.3 | 11 |  | 1.5 |
|  | C2 |  |  |  |  |  |  |
| Charpy impact strength [$kJ/m^2$] |  | C (7.6) | C (7.4) | B (8.4) | B (10.2) | C (3.3) | C (2.9) |
| Tensile elongation at break [%] |  | B (20.4) | B (27.5) | B (24.4) | B (23.3) | C (6.4) | C (3.7) |
| Heat resistance [° C.] |  | A (75) | B (68) | A (75) | A (74) | C (52.6) | C (52.7) |

|  |  | Reference Example 3 | Reference Example 4 | Reference Example 5 | Reference Example 6 |
|---|---|---|---|---|---|
| Polyester resin | A1 |  |  |  |  |
| Polycarbonate/ABS resin | B1 | 100 | 100 |  |  |
|  | B2 |  |  | 100 | 100 |
| Acrylic block copolymer | C1 |  | 1.5 |  | 1.5 |
|  | C2 |  |  |  |  |
| Charpy impact strength [$kJ/m^2$] |  | A (22) | A (21.2) | A (58.3) | A (57.1) |
| Tensile elongation at break [%] |  | A (90) | A (87.4) | A (97) | A (91) |
| Heat resistance [° C.] |  | A (82) | A (81) | A (124) | A (124) |

TABLE 3

| | | Name | Vendor | Remark |
|---|---|---|---|---|
| Polyester resin | A1 | Ingeo 3001D | NatureWorks | Weight-average molecular weight: 220,000<br>D-Lactic acid content of polylactic acid: 1.4% |
| Polycarbonate/ABS resin | B1 | TN7300 (PC/ABS alloy resin) | Tejin | Weight-average molecular weight: 45,000<br>PC:ABS (Ratio by weight) = 75:25 |
| | B2 | PC-122 (polycarbonate resin) | Asahi Kasei Corporation | Weight-average molecular weight: 20,000 |
| Acrylic block copolymer | C1 | LA2250 | Kuraray | Weight-average molecular weight: 60,300, Mw/Mn = 1.14<br>Triblock copolymer of PMMA(16% by weight)-PnBA (68% by weight)-PMMA (16% by weight)<br>(MMA = Methyl methacrylate, and nBA = n-butyl acrylate) |
| | C2 | LA2140e | Kuraray | Weight-average molecular weight: 79,800, Mw/Mn = 1.07<br>Triblock copolymer of PMMA (12% by weight)-PnBA (76% by weight)-PMMA (12% by weight) |

Example 1 has excellent impact resistance and excellent elongation characteristics. In Comparative Example 1, impact resistance and elongation characteristics are insufficient.

In this manner, the resin compositions of the examples have excellent impact resistance and excellent elongation characteristics of a molded article formed from the resin composition compared with the resin compositions of comparative examples. In addition, according to comparison between Reference Example 1 and Reference Example 2, comparison between Reference Example 3 and Reference Example 4, and comparison between Reference Example 5 and Reference Example 6, in the case in which the polyester resin, the polycarbonate/ABS resin, or the polycarbonate resin is singly used as the resin component, the impact resistance and the elongation characteristics are respectively decreased when the acrylic block copolymer is added. Meanwhile, according to comparison between Example 1 and Comparative Example 1, in the case in which both of the polyester resin and the polycarbonate/ABS resin are contained as the resin component, both the impact resistance and the elongation characteristics are enhanced when the acrylic block copolymer is added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polyester resin;
   an alloyed resin of a polycarbonate resin and an acrylonitrile-butadiene rubber-styrene resin; and
   an acrylic block copolymer containing a polymer block containing an acrylic acid ester monomer unit and a polymer block containing a methacrylic acid ester monomer unit,
   wherein a weight ratio of a content of the polyester resin and a content of the alloyed resin is in a range of 5:95 to 50:50,
   wherein a content of the acrylic block copolymer is in a range of 0.5% by weight to 10% by weight with respect to a total of the content of the polyester resin and the content of the alloyed resin,
   wherein the polyester resin is a polylactic acid resin,
   wherein a content of the acrylic acid ester monomer unit in the acrylic block copolymer is in a range of 68% to 76% by weight,
   wherein a content of methacrylic acid ester monomer unit in the acrylic block copolymer is in a range of 24% to 32% by weight,
   wherein a weight-average molecular weight of the acrylic block copolymer is in a range of 60,000 to 80,000, and
   wherein a molecular weight distribution of the acrylic block copolymer (Mw/Mn) is in a range of 1.0 to 2.0.

2. The resin composition according to claim 1, wherein a weight-average molecular weight of the polylactic acid resin is in a range of 50,000 to 300,000.

3. The resin composition according to claim 1, wherein a weight-average molecular weight of the polylactic acid resin is in a range of 70,000 to 250,000.

4. The resin composition according to claim 1, wherein a weight-average molecular weight of the alloyed resin of a polycarbonate resin and an acrylonitrile-butadiene rubber-styrene resin is in a range of 5,000 to 300,000.

5. The resin composition according to claim 1, wherein a weight-average molecular weight of the alloyed resin of a polycarbonate resin and an acrylonitrile-butadiene rubber-styrene resin is in a range of 10,000 to 150,000.

6. The resin composition according to claim 1, wherein the weight ratio of the content of the polyester resin and the content of the alloyed resin is in a range of 20:80 to 40:60.

7. The resin composition according to claim 1, wherein the content of the acrylic block copolymer is in a range of 1% by weight to 8% by weight with respect to the total of the content of the polyester resin and the content of the alloyed resin.

8. A resin molded article obtained by using the resin composition according to claim 1.

* * * * *